US010519346B2

(12) United States Patent
Ryu

(10) Patent No.: US 10,519,346 B2
(45) Date of Patent: *Dec. 31, 2019

(54) COATING SHEET FOR PREVENTING ADHESION OF ADVERTISING MATERIAL

(71) Applicant: SINDO DNT CO., LTD., Seoul (KR)

(72) Inventor: Young-ok Ryu, Seoul (KR)

(73) Assignee: SINDO DNT CO., LTD. (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/318,355

(22) PCT Filed: May 14, 2015

(86) PCT No.: PCT/KR2015/004843
§ 371 (c)(1),
(2) Date: Dec. 12, 2016

(87) PCT Pub. No.: WO2016/035972
PCT Pub. Date: Mar. 10, 2016

(65) Prior Publication Data
US 2017/0166783 A1 Jun. 15, 2017

(30) Foreign Application Priority Data

Sep. 3, 2014 (KR) .......... 10-2014-0116974

(51) Int. Cl.
C09J 7/29 (2018.01)
B32B 27/06 (2006.01)
(Continued)

(52) U.S. Cl.
CPC ............. C09J 7/29 (2018.01); B32B 5/022 (2013.01); B32B 5/26 (2013.01); B32B 7/06 (2013.01);
(Continued)

(58) Field of Classification Search
CPC ..... C09J 7/22; C09J 7/0264; C09J 7/20; C09J 7/026; C09J 7/24; C09J 7/0267;
(Continued)

(56) References Cited

U.S. PATENT DOCUMENTS

2004/0067329 A1* 4/2004 Okuyama ............... B32B 27/08
428/40.1
2004/0202850 A1 10/2004 Hayashi ............... B32B 27/08
(Continued)

FOREIGN PATENT DOCUMENTS

CN 105517799 4/2016 ............. B32B 27/06
CN 105518081 4/2016 ............. B32D 1/02
(Continued)

OTHER PUBLICATIONS

Machine translation of KR 101260262 B1 (Year: 2013).*
(Continued)

Primary Examiner — Scott R. Walshon
(74) Attorney, Agent, or Firm — Hayes Soloway PC

(57) ABSTRACT

A coating sheet for preventing adhesion of advertising materials includes a soft sheet made with a synthetic resin; a protective layer formed on one of the two surfaces of the soft sheet to protect the sheet from decoloration by the ultra-violet rays in the sunlight; a first coating layer formed on the protective layer and provided with a plurality of small projections; a second coating layer formed as a film on the first coating layer; an adhesive layer formed on the opposite side of the soft sheet for attaching the soft sheet; and a release paper layer positioned underside (exposed surface of) the adhesive layer to protect the adhesive layer from being contaminated by foreign materials and losing adhesive power. The coating sheet can be attached to public or private
(Continued)

installation, such as walls, poles, street lights, or traffic lights, to prevent adhesion of unlawful advertising materials on the installation.

15 Claims, 1 Drawing Sheet

(51) Int. Cl.
| | |
|---|---|
| B32B 27/18 | (2006.01) |
| B32B 27/26 | (2006.01) |
| B32B 5/02 | (2006.01) |
| B32B 5/26 | (2006.01) |
| B32B 7/06 | (2019.01) |
| B32B 7/12 | (2006.01) |
| B32B 27/08 | (2006.01) |
| B32B 27/10 | (2006.01) |
| B32B 27/12 | (2006.01) |
| B32B 27/30 | (2006.01) |
| B32B 27/32 | (2006.01) |
| B32B 27/36 | (2006.01) |
| B32B 29/02 | (2006.01) |
| C09D 183/04 | (2006.01) |

(52) U.S. Cl.
CPC ............... *B32B 7/12* (2013.01); *B32B 27/06* (2013.01); *B32B 27/08* (2013.01); *B32B 27/10* (2013.01); *B32B 27/12* (2013.01); *B32B 27/18* (2013.01); *B32B 27/26* (2013.01); *B32B 27/304* (2013.01); *B32B 27/308* (2013.01); *B32B 27/32* (2013.01); *B32B 27/36* (2013.01); *B32B 29/02* (2013.01); *B32B 2250/02* (2013.01); *B32B 2250/03* (2013.01); *B32B 2255/02* (2013.01); *B32B 2255/10* (2013.01); *B32B 2255/26* (2013.01); *B32B 2255/28* (2013.01); *B32B 2262/062* (2013.01); *B32B 2307/412* (2013.01); *B32B 2307/71* (2013.01); *B32B 2405/00* (2013.01); *B32B 2607/00* (2013.01); *C09D 183/04* (2013.01); *C09J 2433/006* (2013.01); *C09J 2463/006* (2013.01); *C09J 2475/006* (2013.01); *C09J 2483/005* (2013.01)

(58) Field of Classification Search
CPC . C09J 7/241; C09J 7/0271; C09J 7/243; C09J 7/0275; C09J 7/245; C09J 7/0278; C09J 7/25; C09J 7/0282; C09J 7/255; C09J 7/0285; C09J 7/29; C09J 7/0296; C09J 7/38; C09J 7/045; C09J 7/02; C09J 2201/606; C09J 2475/006; C09D 5/16; C09D 175/04; E04F 13/02; C08L 75/04
See application file for complete search history.

(56) References Cited

U.S. PATENT DOCUMENTS

| | | | |
|---|---|---|---|
| 2004/0226717 A1 | 11/2004 | Reddy | C09K 8/44 |
| 2017/0166751 A1 | 6/2017 | Ryu | C09D 5/00 |
| 2017/0166783 A1 | 6/2017 | Ryu | C09D 5/00 |

FOREIGN PATENT DOCUMENTS

| | | | |
|---|---|---|---|
| KR | 200367098 | 11/2004 | |
| KR | 20050051590 | 6/2005 | |
| KR | 200403641 | 12/2005 | ............ B32B 27/08 |
| KR | 200411629 | 3/2006 | ............ G09F 15/00 |
| KR | 100771856 | 11/2007 | ........... C09D 175/00 |
| KR | 20080062638 | 7/2008 | ............ B32B 27/06 |
| KR | 101016072 | 2/2011 | ............ B32B 15/08 |
| KR | 101057499 | 8/2011 | ............ B08B 17/02 |
| KR | 101260262 | 5/2013 | ............ B32B 27/08 |
| KR | 101412870 | 6/2014 | ........... C09D 131/04 |
| KR | 101517781 | 5/2015 | ............ B32B 27/06 |
| KR | 101517878 | 5/2015 | ............ B05D 1/02 |
| WO | WO 2016035972 | 3/2016 | ............ B32B 27/26 |
| WO | WO 2016035973 | 3/2016 | ............... C09D 7/12 |

OTHER PUBLICATIONS

International Search Report and Written Opinion (w/translation) issued in application No. PCT/KR2015/004843, dated Aug. 7, 2015 (23 pgs).
Canadian Official Action for related Canadian Patent Application Serial No. 2,951,518, dated Mar. 14, 2018 (4 pages).
Canadian Official Action for related Canadian Patent Application Serial No. 2,951,520, dated Mar. 15, 2018 (3 pages).
Official Action for related U.S. Appl. No. 15/318,354, dated Oct. 18, 2019 (17 pages).

* cited by examiner

COATING SHEET FOR PREVENTING ADHESION OF ADVERTISING MATERIAL

TECHNICAL FIELD

The present invention relates to a coating sheet for preventing adhesion of advertising materials, and more particularly, a coating sheet which is attached to public or private facilities, such as a wall, pole, street light pole, or a traffic light pole, for the purpose of preventing attachment of unlawful advertising materials.

BACKGROUND ART

Generally, the poles for street lamps, road signs, traffic signals, and power transmission are installed at places having very good visibility. Accordingly, they attract attachment of unlawful advertisement materials.

Other road facilities installed at highly-visible locations further include fences and breast walls, which are also exposed to adhesion of unlawful advertising materials.

Unlawful advertising materials are one of the major sources which deteriorate urban environment. The leaflets and posters posted on various private and public facilities without due authorization defile the appearance of the street, especially, those attached on the surface or posts of traffic signs can be a cause of traffic accident by distracting drivers from driving or deteriorating the communication capacity of the traffic signs.

In the mean time, many local governments are operating a dedicated team for removing such unlawful advertising materials on a continuous basis, however, fail to provide a fundamental solution due to high cost.

To this end, plates or sheets which can prevent unlawful advertising materials from being attached on street lights, road signs, and traffic signals installed along on the roads are suggested.

Examples of the sheets for preventing unlawful advertising materials include a sheet made of rubber or a synthetic resin, formed with conical, quadrangular pyramidal, or similar projections on one surface, and the sheet wraps around a post of street light, road sign or traffic light and fastened with one or more additional bands.

However, this configuration requires additional bands and fasteners to fix the sheet, and defiles the appearance of the street with the exposed bands and fasteners, not mentioning the structural complexity.

PRIOR TECHNICAL REFERENCE

Patent Reference (Patent Reference 1) Korean Registered Patent No. 10-1412870 (registered on Jun. 20, 2014)
(Patent Reference 2) Korean Registered Utility Model No. 20-0411629 (registered on Mar. 9, 2006)

DETAILED DESCRIPTION OF THE INVENTION

Technical Objects

An aspect of the present invention is to provide a coating sheet which is attached on public or private facilities, such as walls, poles, street lights, or traffic lights for preventing adhesion of unlawful advertising materials on the facilities.

Another aspect of the present invention is to provide a coating sheet for preventing adhesion of unlawful advertising materials by being coated on the surface of installations or printed materials to reduce adhesive strength. In addition, the coating sheet in accordance with the present invention enables removal of advertising materials attached with adhesives without using a special tool, such as a scrapper, and without residual adhesives.

Still another aspect of the present invention is to provide a coating sheet for preventing adhesion of unlawful advertising materials, the sheet having electrical insulating power to prevent electric shock caused by leakage current for safe application to electrical installations such as street lights and traffic lights.

The invention is not restricted to the embodiments set forth herein. The above and other aspects of the invention will become apparent to those skilled in the art to which the invention pertains by referencing the detailed description of the invention below.

Technical Solution

The coating sheet for preventing adhesion of unlawful advertising materials in accordance with the present invention comprises: a soft sheet made with a synthetic resin; a protective layer formed on one of the two surfaces of the soft sheet to protect the sheet from being discoloration and decoloration by the ultra-violet (UV) rays in the sunlight; a first coating layer formed on the protective layer and provided with a plurality of small projections; a second coating layer formed on the first coating layer as a film on the first coating layer; an adhesive layer formed on the opposite side of the soft sheet for attaching the soft sheet; and a release paper layer positioned underside (exposed surface of) the adhesive layer to protect the adhesive layer from being contaminated by foreign materials and losing adhesive strength.

The protective layer may be formed by printing or silk screen printing UV protective ink on the soft sheet.

The first coating layer may be formed by coating and drying: 25 to 35 parts by weight of urethane resin solution, acrylic resin solution, or epoxy resin solution; 10 to 20 parts by weight of PE-thermoplastic resin beads, phenol resin beads, melamine resin beads, epoxy resin beads, polystyrene resin beads or glass beads; 40 to 52 parts by weight of urethane thinner and toluene; and 2 to 4 parts by weight of curing agent, on the soft sheet.

The curing agent may be any one of isocyanate TDI (toluene di-isocyanate), MDI urethane synthetic resin, diethylenetriamine (DETA), TET (Tetramethylthiurammonosulfide), acrylic, and epoxy curing agent.

The first coating layer can be formed with PE-thermoplastic resin beads, phenol resin beads, melamine resin beads, epoxy resin beads, polystyrene resin beads or glass beads having diameters ranging from between about 10 to about 500 μm.

The first coating layer may further comprise silica curing agent.

The second coating layer may be formed by coating and drying a solution comprising: 8 to 12 parts by weight of silicon release agent; 40 to 55 parts by weight of hexane; 20 to 25 parts by weight of toluene; and 0.08 to 0.18 parts by weight of platinum catalyst, on the first coating layer.

The second coating layer may be formed by air spray coating or roller coating method on the first coating layer.

The second coating layer may be formed by natural drying at 10 to 35 degrees Celsius for from one and a half hour to two and a half hour.

The first coating layer and the second coating layer may further comprise an oil component.

The oil component can be one of the group consisting of silicone oil, paraffin oil, terrapin oil, and petrol oil.

The second coating layer can be formed with a mixture of platinum catalyst and acetic acid type silicone or non-acetic acid type silicone.

In addition, the coating sheet for preventing adhesion of advertising materials in accordance with the present invention can comprise: a first coating layer formed with small projections and coated on the surface of installation; and a second coating layer coated and formed on the first coating layer in a film shape, wherein the first coating layer is formed by coating a mixture comprising 25 to 35 parts by weight of urethane resin solution, acrylic resin solution, or epoxy resin solution, 10 to 20 parts by weight of PE-thermoplastic resin beads, phenol resin beads, melamine resin beads, epoxy resin beads, polystyrene resin beads or glass beads, 40 to 52 parts by weight of urethane thinner and toluene, and 2 to 4 parts by weight of curing agent, on the surface of the installation and dried, and the second coating layer is formed by coating a solution comprising 8 to 12 parts by weight of silicon release agent, 40 to 55 parts by weight of hexane, 20 to 25 parts by weight of toluene, and 0.08 to 0.18 parts by weight of platinum catalyst, and dried on the first coating layer.

The first coating layer or the second coating layer may further comprise an oil component which can be selected from the group consisting of silicone oil, paraffin oil, terrapin oil, and petrol oil.

The first coating layer or the second coating layer may be formed by air spray coating or roller coating method.

The PE-thermoplastic resin beads, phenol resin beads, melamine resin beads, epoxy resin beads, polystyrene resin beads or glass beads can have diameters ranging from between about 10 to about 500 μm.

The second coating layer can be formed with a mixture of platinum catalyst and acetic acid type silicone or non-acetic acid type silicone.

Effects of the Invention

The coating sheet in accordance with an embodiment of the present invention can be attached to public or private installations, such as walls, poles, street lights, or traffic lights, to prevent adhesion of unlawful advertising materials on the installation.

In addition, the coating sheet for preventing adhesion of unlawful advertising materials in accordance with the present invention enables removal of advertising materials attached with adhesives without using a special tool, such as a scrapper, and without residual adhesives, by being coated on the surface of installations or printed materials to reduce adhesive strength.

In addition, the coating sheet for preventing adhesion of advertising materials in accordance with the present invention can be provided with electrical insulation property to prevent electric shock caused by leakage current for safe application to electrical installations such as street lights and traffic lights.

It will be apparent for those skilled in the art that the embodiments in accordance with the present invention can provide various effects not described in further details.

Figure 1:
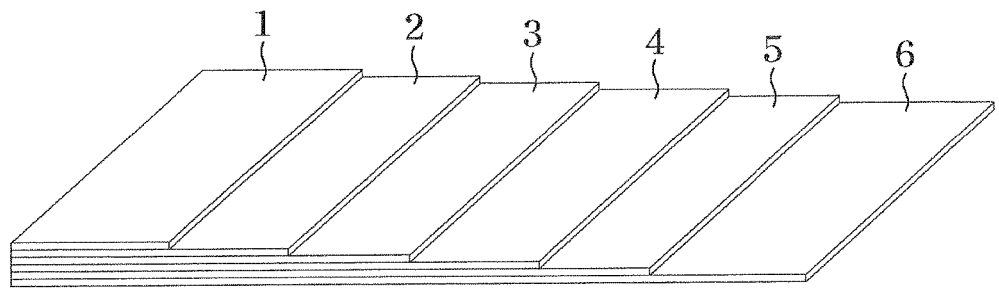
FIG. 1 is a perspective, partially exploded view of the coating sheet for preventing adhesion of advertising materials in accordance with the present invention.

DESCRIPTION OF THE PREFERRED
EMBODIMENT OF THE INVENTION

The advantages and characteristic features, and the method for achieving the advantages of the present invention will be clarified by the embodiments described in details and the attachment drawing, hereinbelow. However, the present invention is not limited to the embodiments provided here but can be implemented in various ways. Rather, the embodiments set forth and described hereinafter are provided to help the present invention to be understood easily and clearly, and to provide the persons skilled in the art with sufficient information related with the present invention. In the drawings, the thicknesses of the layers and regions are exaggerated for clear visibility.

The terms such as top, bottom, upper surface, lower surface, or upper portion and lower portion are used in this description to specify relative positions of the components. For example, to designate the upper and lower portions of a drawing as the upper and lower portions, respectively, the upper portion and the lower portion of the drawing may be designated as the lower portion and the upper portion, respectively, without departing from the scope of the present invention.

The terms used in this description are adopted only to describe the specific embodiment, and are not intended to limit the scope of the present invention. The singular nouns in this description shall represent plural nouns unless singular and plural can be distinguished clearly according to the context. In this description, the terms "comprise" or "comprised of" are used with the intension to express that the characteristics, figures, steps, motions, components, parts, or the combinations thereof exist, but should be interpreted that they do not to eliminate the existence or additional possibilities of one or more different characteristics, figures, steps, motions, components, parts or the combinations thereof.

Unless otherwise defined herein, the terms including the scientific terms used in this description shall bear the meanings that are generally understood by those skilled in the art. The terms bearing the meanings as defined in common dictionaries shall be interpreted as the meanings in the context of the art, and shall not be interpreted in an ideal or excessively formal meaning unless otherwise defined in this description clearly.

Preferable embodiments of the coating sheet for preventing adhesion of advertising materials in accordance with the technical spirit of the present invention are described hereinbelow in further detail referring to the accompanying drawings.

Figure 2:
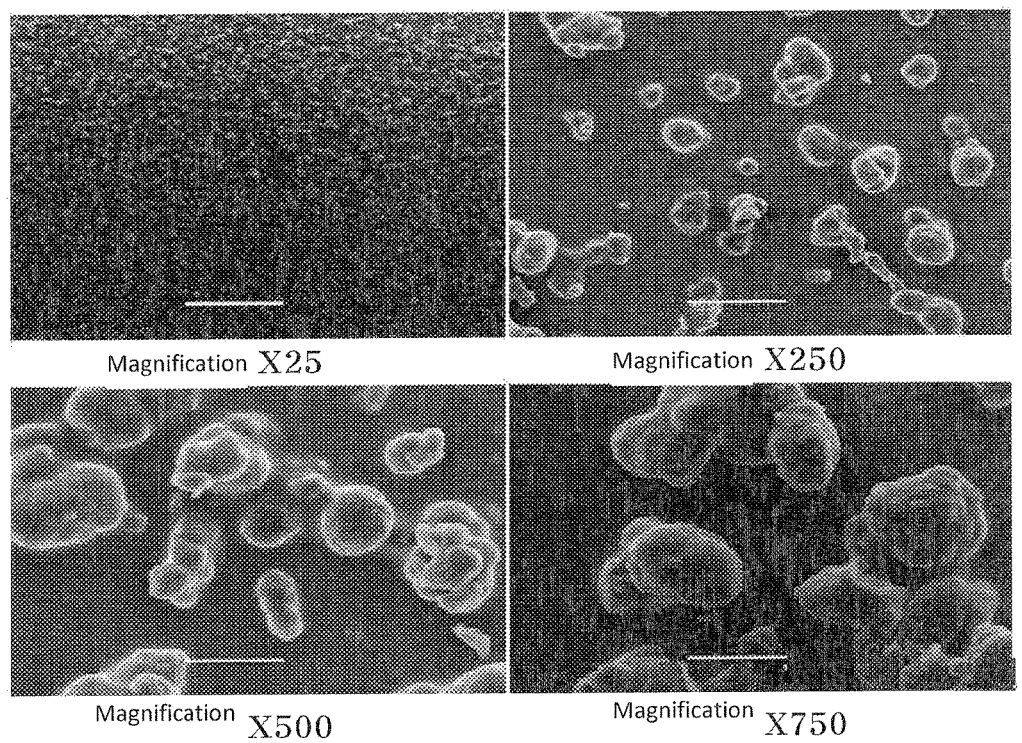
FIG. 2 is a picture of the small projections formed on the first coating layer of the coating sheet for preventing adhesion of advertising materials in accordance with the present invention, obtained by scanning electron microscopy (SEM).

FIG. 1 is a perspective, partially exploded view of the coating sheet for preventing adhesion of advertising materials in accordance with the present invention, and FIG. 2 is a picture of the small projections formed on the first coating layer of the coating sheet for preventing adhesion of advertising materials in accordance with the present invention, obtained by scanning electron microscopy (SEM).

The coating sheet in accordance with an embodiment of the present invention can be attached to public or private installation, such as walls, poles, street lights, or traffic lights, to prevent adhesion of unlawful advertising materials on the installation. In the present invention, the advertising materials include leaflets, stickers and other bills posted on outdoor installations using adhesives.

Referring to FIGS. 1 and 2, the coating sheet for preventing adhesion of advertising materials in accordance with the present invention comprises a soft sheet 4, a protective layer 3, a first coating layer 2, a second coating layer 1, an adhesive layer 5 and a release paper layer 6.

The soft sheet 4 is formed with PVC, FLEX fabric, PP, PET, or other soft synthetic resins and can be provided with flexibility to be able to be bent in a curved or cylindrical shape, or by a certain degrees to fit the shape of the target surface. The soft sheet 4 can be formed in a flexible plate or film.

The protective layer 3 can be provided on one of the two sides of the soft sheet 4 for the purpose of protecting the surface of the soft sheet 4 from UV in the sunlight. That is, the protective layer 3 is coated on the surface of the soft sheet 4 to protect the soft sheet 4 from being discolored or decolored by the UV rays of the sunlight.

The protective layer 3 can be formed with a UV protective ink for protecting the soft sheet from UV, and the UV protective ink can be applied to the soft sheet 4 by printing, silk screen printing, or other printing methods.

The first coating layer 2 is colorless and transparent, coated on the protective layer 3 to reduce adhesive strength with advertising materials. The first coating layer 2 is provided with very small projections on the surface to allow easy removal of advertising materials attached on the coating sheet in accordance with the present invention without using a mechanical means such as a scrapper. The first coating layer 2 can be formed on the protective layer 3 by air spraying or roller coating method.

The first coating layer 2 may comprise: 25 to 35 parts by weight of urethane resin solution, acrylic resin solution, or epoxy resin solution; 10 to 20 parts by weight of PE-thermoplastic resin beads, phenol resin beads, melamine resin beads, epoxy resin beads, polystyrene resin beads or glass beads having a wide range of diameters between from 10 to 500 μm; 40 to 52 parts by weight of urethane thinner and toluene; and 2 to 4 parts by weight of curing agent for increasing hardness or promoting hardening. The curing agent may be isocyanate TDI (toluene di-isocyanate), MDI urethane synthetic resin, diethylenetriamine (DETA), TET (Tetramethylthiurammonosulfide), acrylic, or epoxy curing agent.

The composition constituting the first coating layer 2 of the coating sheet for preventing adhesion of advertising materials in accordance with the present invention can further comprise a silica curing agent. The silica curing agent used in cold seasons can be added to reduce curing time and drying time of the composition of the first coating layer at an ambient temperature between from −1 to −20 degrees Celsius. For the purpose of the present invention, the silica curing agent can be added by from 4 to 8 parts by weight.

The second coating layer 1 is formed on the first coating layer 2 after the first coating layer 2 has been coated and dried. The second coating layer 1 can be applied onto the first coating layer 2 by air spraying or roller coating method, can be formed in a thin film shape to improve releasability, and can prevent adhesion of the adhesive of advertising materials.

The second coating layer 1 can comprise 8 to 12 parts by weight of silicon release agent, 40 to 55 parts by weight of hexane, 20 to 25 parts by weight of toluene, and 0.08 to 0.18 parts by weight of platinum catalyst to promote curing.

In the present invention, the second coating layer 1 can further comprise acetic acid type silicone or non-acetic acid type silicone to promote curing. In an embodiment of the present invention, platinum catalyst is used to promote curing, and in addition, a mixture of platinum catalyst and acetic acid type of non-acetic acid type silicone can be used to further reduce the curing time.

Acetic acid type silicone which is a silicone based on acetic acid, has acidity and fast curing rate, is low priced and highly adhesive to glass and ceramic materials. Non-acetic acid type silicone which does not contain acetic acid in the silicone provides good adhesive strength to mirrors, aluminum, wood, and stone, and its drying rate is lower than that of acetic acid type but it can provide stable adhesive strength.

The coating sheet in accordance with the present invention for preventing adhesion of advertising materials comprises PE-thermoplastic resin beads, phenol resin beads, melamine resin beads, epoxy resin beads, polystyrene resin beads or glass beads in the first coating layer 2, and silicone release agent in the second coating layer 1, and the first coating layer 2 and the second coating layer 1 provide insulation property when cured. As such, the coating sheet in accordance with the present invention for preventing adhesion of advertising materials can prevent electric shock when applied to street lights and traffic lights.

The first coating layer 2 and the second coating layer 1 may further comprise an oil component to improve releasability from advertising materials.

The oil can be selectively silicone oil, paraffin oil, terrapin oil, or petrol oil, and can be added in the mixture of the first coating solution and the second coating solution to further improve releasability of the first coating solution and the second coating solution.

The adhesive layer 5 formed on the opposite, bottom surface of the soft sheet 4 can be provided to attach the soft sheet 4 onto the installations such as walls, poles, street lights, road signs, and traffic lights. The adhesive layer 5 can be so formed as to provide an adhesive strength of at least 10 N/cm to ensure stable adhesion on the installations such as walls, poles, street lights, road signs, and traffic lights. In accordance with an embodiment of the present invention, the adhesive layer 5 can be implemented with a double-sided adhesive tape made of a non-woven fabric or an acrylic monomer film tape.

The release paper layer 6 can be positioned underside (exposed surface of) the adhesive layer 5 to protect the adhesive layer 5 from being contaminated by foreign materials and losing adhesive strength. The surface of the release paper layer 6 can be so processed as to allow easy release from the adhesive layer 5.

The method for preparing the coating sheet for preventing adhesion of advertising materials in accordance with the present invention is described hereinbelow in further detail referring to the accompanying drawings.

First, a soft sheet 4 can be prepared. The soft sheet 4 can be formed with PVC, FLEX fabric, PP, PET, or other soft synthetic resins and can be provided with flexibility to be able to be bent in a curved or cylindrical shape, or by a certain degrees to fit the shape of the target surface.

Second, a protective layer 3 can be formed on one side of the soft sheet 4. The protective layer 3 is coated on the surface of the soft sheet 4 to protect the soft sheet 4 from being discolored or decolored by the UV rays of the sunlight. For this, the protective layer 3 can be formed by costing a UV protective ink. The protective layer 3 can be formed on the soft sheet 4 by printing or coating a UV protective ink by various printing and coating techniques, for example, silk screen printing.

In the next step, a first coating layer 2 can be formed on the protective layer 3. The first coating layer 2 can be formed by air spraying or roller coating a composition comprising 25 to 35 parts by weight of urethane resin solution, acrylic resin solution, or epoxy resin solution, 10 to 20 parts by weight of PE-thermoplastic resin beads, phenol resin beads, melamine resin beads, epoxy resin beads, polystyrene resin beads or glass beads having a diameter ranging between from 10 to 500 am, 40 to 52 parts by weight of urethane thinner and toluene, and 2 to 4 parts by weight of curing agent which can be isocyanate TDI (toluene di-isocyanate), MDI urethane synthetic resin, diethylenetriamine (DETA), TET (Tetramethylthiurammonosulfide), acrylic, or epoxy curing agent, and drying the coating at a temperature from between 10 to 35 degrees Celsius for from one and a half hour to two and a half hour, naturally. During the curing process, the composition foil is very small irregularities as shown in FIG. 2.

The composition constituting the first coating layer 2 can further comprise a silica curing agent for use in cold seasons.

The second coating layer 1 can be formed on the first coating layer 2 after the first coating layer 2 has been formed. The second coating layer 1 may be formed by coating a solution comprising: 8 to 12 parts by weight of silicon release agent; 40 to 55 parts by weight of hexane; 20 to 25 parts by weight of toluene; and 0.08 to 0.18 parts by weight of platinum catalyst, on the first coating layer 2 and drying the coating at a temperature from between 10 to 35 degrees Celsius for from one and a half hour to two and a half hour, naturally. The second coating layer 1 is applied onto the first coating layer 2 to form a thin film so that the second coating layer 1 can improve releasability and prevent adhesion of the adhesive of advertising materials.

In an embodiment of the present invention for preparing a coating sheet for preventing adhesion of advertising materials, platinum catalyst is used to reduce curing time, wherein the platinum catalyst can be added with acetic acid type or non-acetic acid type silicone to further reduce the curing time.

In the next step, the protective layer 3, the first coating layer 2, and the second coating layer 1 is coated on one side of the soft sheet 4, in said order, followed by coating the adhesive layer 5 for attaching the soft sheet on the installations such as walls, poles, street lights and traffic lights, and the release paper layer for protecting the adhesive layer 5 from being contaminated by foreign matter and losing adhesive strength, on the opposite side of the soft sheet 6, in said order, to complete a coating sheet for preventing adhesion of advertising materials in accordance with the present invention.

In addition, the method for preparing a coating sheet for preventing adhesion of advertising materials in accordance with the present invention may further comprise the steps of adding oil in the first coating layer 2 and the second coating layer 1 to improve releasability from advertising materials. The oil can be selected from silicone oil, paraffin oil, terrapin oil and petrol oil, and can be mixed up with the composition for the first coating layer 2 or second coating layer 1 using a stirrer for 5 to 15 minutes for use to form the first coating layer 2 or second coating layer 1.

In addition, while an embodiment of the present invention provides a method for preparing a coating sheet for preventing adhesion of advertising materials comprising the steps of coating the first coating layer 2 and the second coating layer 1 on the soft sheet 4 formed with the protective layer 3, a coating sheet for preventing adhesion of advertising materials in accordance with the present invention can also be prepared by coating and laminating the first coating layer 2 and the second coating layer 1 on the surface of installations. That is, the installations can include such structures as walls, poles, street lights, and traffic lights, and the first coating layer 2 and the second coating layer 1 can be coated on the surface of such installations to preventing adhesion of advertising materials.

From the foregoing it is believed that those skilled in the pertinent art will recognize the meritorious advancement of this invention and will readily understand that while the present invention has been described in association with a preferred embodiment thereof, and in the accompanying drawings, numerous changes and modifications may be made therein by those skilled in the art without departing from the spirit and scope of this invention. Accordingly, the scope of the present invention is intended to embrace all such alternatives, modifications, and variations as fall within the scope of the claims, together with all equivalents thereof.

What is claimed is:

1. A coating sheet for preventing adhesion of advertising materials, comprising:
   a flexible sheet made of a synthetic resin;
   a protective layer formed on one of the two surfaces of the sheet to protect the sheet from discoloration and decoloration by ultra-violet rays of sunlight;
   a first coating layer formed on the protective layer and provided with a plurality of small projections;
   a second coating layer formed on the first coating layer as a film on the first coating layer;
   an adhesive layer formed on the opposite side of the flexible sheet for attaching the flexible sheet; and
   a release paper layer positioned underside and on the adhesive layer to protect the adhesive layer from being contaminated by foreign materials and losing adhesive strength;
   wherein the first coating layer is substantially formed by coating and drying:
      25 to 35 parts by weight of urethane resin solution, acrylic resin solution, or epoxy resin solution;
      10 to 20 parts by weight of Polyethylene (PE) thermoplastic resin beads, phenol resin beads, melamine resin beads, epoxy resin beads, polystyrene resin beads or glass beads;
      40 to 52 parts by weight of urethane thinner and toluene; and
      2 to 4 parts by weight of curing agent, on the flexible sheet; and
   wherein the curing agent is substantially isocyanate TDI (toluene di-isocyanate), MDI urethane synthetic resin, diethylenetriamine (DETA), TET (Tetramethylthiurammonosulfide), acrylic, or epoxy curing agent.

2. The coating sheet for preventing adhesion of advertising materials of claim 1, wherein the protective layer is formed by physical printing or silk screen printing a UV protective ink on the flexible sheet.

3. The coating sheet for preventing adhesion of advertising materials of claim 1, wherein the Polyethylene (PE) thermoplastic resin beads, phenol resin beads, melamine resin beads, epoxy resin beads, polystyrene resin beads or glass beads have diameters ranging from between about 10 μm to about 500 μm.

4. The coating sheet for preventing adhesion of advertising materials of claim 1, wherein the curing agent of the first coating layer comprises a silica curing agent.

5. The coating sheet for preventing adhesion of advertising materials of claim 1, wherein the second coating layer is substantially formed by coating and drying a solution comprising:
8 to 12 parts by weight of silicone release agent;
40 to 55 parts by weight of hexane;
20 to 25 parts by weight of toluene; and
0.08 to 0.18 parts by weight of platinum catalyst, on the first coating layer.

6. The coating sheet for preventing adhesion of advertising materials of claim 5, wherein the second coating layer is formed by air spray coating or roller coating method on the first coating layer.

7. The coating sheet for preventing adhesion of advertising materials of claim 5, wherein the second coating layer is formed by natural drying at 10 to 35 degrees Celsius for from one and a half hours, to two and a half hours.

8. The coating sheet for preventing adhesion of advertising materials of claim 5, wherein the platinum catalyst of the second coating layer comprises platinum catalyst previously mixed with acetic acid type or non-acetic acid type silicone.

9. The coating sheet for preventing adhesion of advertising materials of claim 1, wherein the first coating layer or the second coating layer further comprises an oil component.

10. The coating sheet for preventing adhesion of advertising materials off claim 9, wherein the oil component is selected from the group consisting of silicone oil, paraffin oil, terrapin oil, and petrol oil.

11. A coating sheet for preventing adhesion of advertising materials, comprising:
a first coating layer formed with very small irregularity or projections and coated on an installation; and
a second coating layer coated and formed on the first coating layer in a film shape, wherein the first coating layer is formed by:
coating a mixture comprising 25 to 35 parts by weight of urethane resin solution, acrylic resin solution, or epoxy resin solution, 10 to 20 parts by weight of Polyethylene (PE) thermoplastic resin beads, phenol resin beads, melamine resin beads, epoxy resin beads, polystyrene resin beads or glass beads, 40 to 52 parts by weight of urethane thinner and toluene, and 2 to 4 parts by weight of curing agent, on the surface of the installation and dried;
and the second coating layer is formed by:
coating a solution comprising 8 to 12 parts by weight of silicone release agent, 40 to 55 parts by weight of hexane, 20 to 25 parts by weight of toluene, and 0.08 to 0.18 parts by weight of platinum catalyst, and dried on the first coating layer.

12. The coating sheet for preventing adhesion of advertising materials of claim 11, wherein the first coating layer or the second coating further comprises an oil component which is selected from the group consisting of silicone oil, paraffin oil, terrapin oil, and petrol oil.

13. The coating sheet for preventing adhesion of advertising materials of claim 11, wherein the first coating layer or the second coating layer is formed by air spray coating or roller coating method.

14. The coating sheet for preventing adhesion of advertising materials of claim 11, wherein the PE-thermoplastic resin beads, phenol resin beads, melamine resin beads, epoxy resin beads, polystyrene resin beads or glass beads have a diameter ranging from between about 10 μm to about 500 μm.

15. The coating sheet for preventing adhesion of advertising materials of claim 11, wherein the platinum catalyst of the second coating layer comprises platinum catalyst previously mixed with acetic acid type or non-acetic acid type silicone.

* * * * *

UNITED STATES PATENT AND TRADEMARK OFFICE
CERTIFICATE OF CORRECTION

PATENT NO. : 10,519,346 B2
APPLICATION NO. : 15/318355
DATED : December 31, 2019
INVENTOR(S) : Young-ok Ryu Page 1 of 1

It is certified that error appears in the above-identified patent and that said Letters Patent is hereby corrected as shown below:

In the Claims

Claim 10, Column 9, Line 32 "materials off claim 9" should be --materials of claim 9--

Signed and Sealed this
Seventh Day of April, 2020

Andrei Iancu
*Director of the United States Patent and Trademark Office*